April 12, 1949.  B. G. CARLSON  2,467,254
HORIZON GYRO
Filed Feb. 24, 1945
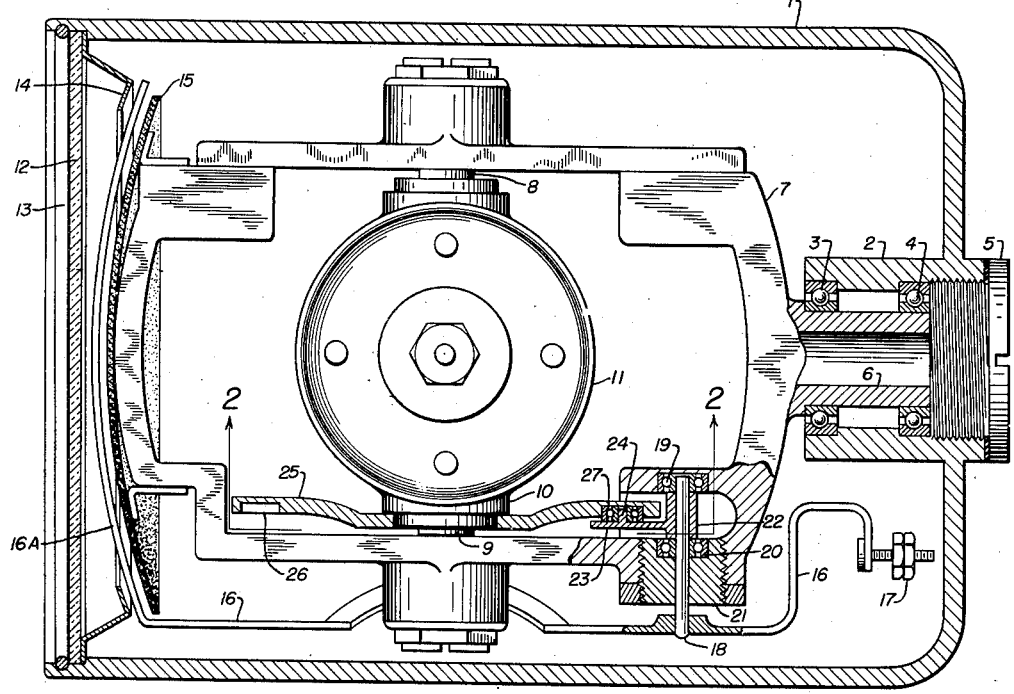
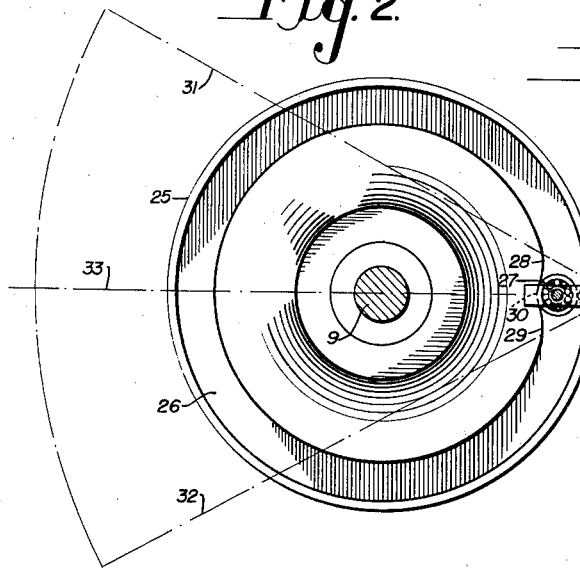
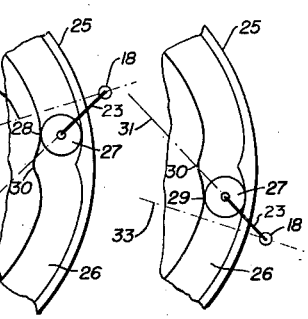
INVENTOR.
BERT G. CARLSON
BY Frank H. Harmon
ATTORNEY Patented Apr. 12, 1949

2,467,254

UNITED STATES PATENT OFFICE 2,467,254

HORIZON GYRO

Bert G. Carlson, Gates Mills, Ohio, assignor, by mesne assignments, to Jack & Heintz Precision Industries, Inc., Cleveland, Ohio, a corporation of Delaware Application February 24, 1945, Serial No. 579,581

3 Claims. (Cl. 33—204)

This invention relates to gyro assemblies and has for one of its specific objects to provide an horizon gyro indicator with an improved gimbal suspension that will permit 360° of freedom both in roll and pitch and an improved connection between the gimbal suspension and the horizon bar whereby the movement of the latter to indicate pitch is limited, and for roll indication unlimited, or vice versa, without interfering with the 360° freedom of gimbal suspension in roll or pitch.

To this end it is proposed to mount the pivot spindle of the horizon bar in the outer gimbal and a substantially circular guideway on the inner gimbal. The guideway has a relatively small radially inwardly extending eccentric portion which an arm that is rigid with the spindle engages while the craft is in an attitude of level flight. A deviation of the craft from an attitude of level flight causes a movement of the pivot arm which movement is restricted by the guideway. The pivot arm in its engagement with the guideway causes a turning of the spindle during the movement of the pivot arm in the eccentric portion of the guideway until the concentric portion guideway is engaged by the pivot arm to prevent any further turning of the pivot. This arrangement, however, provides 360° freedom of movement of the inner gimbal about an axis at right angles to the plane of suspension of the outer gimbal.

With the foregoing and other objects in view, the invention resides in the combination of parts and in the details of construction hereinafter set forth in the following specification and claims, certain embodiments thereof being illustrated in the accompanying drawings, in which:

Figure 1 is a view partly in top plan and partly in cross section of the gyro gimbal suspension and horizon bar as well as the connecting means between the same; and Figure 2 is a view in section taken along line 2—2 of Figure 1 showing the restraining means and guiding track therefor for limiting the movement of the horizon bar.

Figure 3 is a fragmentary view of the inner gimbal plate and groove showing the position of the bearing and arm in the groove when the bearing is shifted counterclockwise out of the eccentric into the concentric portion of the groove; and Figure 4 is a similar showing when the bearing is shifted clockwise out of the eccentric portion of the groove.

Referring more particularly to the drawings, the housing, or box, 1 is provided with a boss 2 having bearing assemblies 3 and 4 maintained therein by a plug 5 to support the single trunnion 6 of an outer gimbal suspension frame 7 for 360° freedom of movement about its trunnion 6 whose axis is longitudinal with respect to the vehicle carrying the gyro. Gimbal frame 7 is provided with suitable bearings to support trunnions 8 and 9 of an inner gimbal 10 including the housing 11 for the vertical spin axis gyro rotor which suspension provides 360° freedom of movement of the inner gimbal about its trunnions 8 and 9 whose axis is transverse with respect to the vehicle carrying it.

The front of the horizon gyro indicator is conventional and includes a glass 12 held in place by a snap ring 13. The peripheral dial 14 may carry indicia graded in degrees of bank, or roll. The central dial 15 may carry the conventional miniature airplane and be graded in degrees of pitch, while the horizon bar extension 16A is mounted to move between the two dials to indicate pitch and roll and combinations thereof. The horizon bar 16 carries at its other end the conventional adjustable counterweight nut 17.

The horizon bar 16 is rigid with its pivot spindle 18 that is supported for rotation in a bearing assembly 19 in the outer gimbal 7 and in a bearing assembly 20 carried by a plug 21 adjustable in gimbal 7 so as to permit rotation of the horizon bar about an axis defined by its pivot spindle 18. Also rigid with spindle 18 is a sleeve 22 with an integral arm 23 having an integral pin 24. The inner gimbal 10 has a plate 25 rigid therewith. Plate 25 has a track, or groove guideway, 26 to receive a ball bearing assembly 27 for supporting pin 24 of the arm 23.

Referring to Figure 2, it will be seen that the major portion of the track 26 is circular with the exception of the distance between points 28 and 29 between which the track is eccentric in that it is extended radially inwardly to a midway apex point 30. For purposes of illustration the bearing 27 is shown engaging the point 30 and the spindle 18 and arm 23 are in neutral positions which they occupy when the craft is in an attitude of level flight which latter is indicated in dotted lines at 33. Thus the attitude of arm 23 is coincident with dotted line 33. The two angles between dotted lines 33 and 31 and lines 33 and 32 represent the limits of movement of the spindle below and above the normal neutral position before the engagement of the bearing assembly with the major concentric circular portion of the track 26 restricts the spindle against any further angular movement.

The construction just described is so arranged that when the craft is in level flight the bearing assembly 27 occupies the position shown in full lines in the depressed portion of the track 26 at point 30. As the craft deviates from level flight to assume an attitude of climb the box 1 and the outer gimbal become similarly inclined to the horizontal as viewed in Figure 3. This causes the portion 16A of the horizon bar 16 that extends over the instrument dial to become depressed relative to the dial.

As shown in Figure 3, the climb attitude of the craft is indicated by the dotted line 33 which has shifted from its position of Figure 2 to be inclined upwardly from left to right. The spindle 18 has been moved from its position of Figure 2 to the elevated position of Figure 3. Due to the fact that arm 23 is rigid with spindle 18 and pin 24, the bearing assembly 27 has been pulled upwardly in the track 26 by spindle 18 out of the eccentric track portion 30 to a point 28 which is the initial portion of the concentric circular portion of the track. This action of the spindle 18 pulling the bearing assembly 24 causes a turning movement of the spindle in a counterclockwise direction which swings the horizon bar 16 downwardly to the angular attitude indicated by the dotted line 32, which action described moves the horizon bar 16A downwardly over the face of the instrument.

As shown in Figure 4, the dive attitude of the craft is indicated by the dotted line 33 which is now downwardly inclined from left to right. The spindle 18 has been moved to the depressed position shown. The spindle 18 has been moved downwardly and has pulled the bearing assembly 27 downwardly in the track 26 out of the depressed eccentric portion 30 to point 29 which is the other initial portion of the concentric circular portion of the track. This swings the horizon bar 16 upwardly to the angular attitude indicated by the upwardly inclined dotted line 31 which action described moves the horizon bar upwardly over the face of the instrument.

From the foregoing it will be seen that there has been provided a simple and improved gyro suspension and horizon bar actuating system whereby 360° freedom of movement of the inner and outer gimbals is provided while still permitting the horizon bar to indicate pitch and roll. While in the particular embodiment illustrated the roll indication is unlimited and the pitch indication limited, it is to be understood that the principle of the invention lends itself adaptable to modify the gimbal suspension and horizon bar actuating means to obtain an unlimited pitch indication. In either event the sacrifice of limits of roll or pitch indication is more than compensated for by the lack of interference between the suspension and the horizon bar actuating means and the elimination of upset of the latter to give diametrically opposite and erroneous indications.

I claim:

1. In a gyro horizon, a gyro rotor suspension therefor including an outer gimbal and an inner gimbal frame movable relatively to each other about a first axis and movable together about another axis at right angles to the first, a horizon bar having a pivot spindle carried by one of said gimbal frames, a pivot arm fixed to said pivot spindle, a track carried by the other gimbal frame, said track being circular and concentric with said first axis with the exception of a relatively small eccentric portion said eccentric portion being adapted to engage said pivot arm when said horizon bar is in neutral position in which engagement with said eccentric portion said pivot arm is adapted to be rotated about its axis in response to relative movement between said inner and outer gimbal frames, said pivot arm being confined to such engagement with said eccentric track portion within a predetermined range of relative movement between said gimbal frames, said pivot arm when moved out of engagement with said eccentric portion into said concentric portion of said track being free to move therein but restrained thereby against rotation about its own axis.

2. In a gyro horizon, a gyro rotor suspension therefor including an outer gimbal and an inner gimbal frame movable relatively to each other about a first axis and movable together about another axis at right angles to the first, a horizon bar having a pivot spindle carried by one of said gimbal frames, a pivot arm fixed to said pivot spindle, a track carried by the other gimbal frame, said track being circular and concentric with said first axis with the exception of a relatively small radially inwardly extending eccentric portion, said pivot arm carrying a roller adapted to engage said eccentric portion when said horizon bar is in neutral position whereby said pivot arm is adapted to be rotated about its axis in response to relative movement between said inner and outer gimbal frames, said pivot arm having its roller confined to such engagement with said eccentric track portion within a predetermined range of relative movement between said gimbal frames, said pivot arm when moved out of engagement with said eccentric portion into said concentric portion of said track having its roller free to roll therein but said pivot arm being restrained by said track against pivoting about its own axis.

3. In a gyro horizon, a gyro rotor suspension therefor including an outer gimbal and an inner gimbal frame movable relatively to each other about a first axis and movable together about another axis at right angles to the first, a horizon bar having a pivot spindle carried by one of said gimbal frames, a pivot arm fixed to said pivot spindle, a track carried by the other gimbal frame, said track being circular and concentric with said first axis with the exception of a relatively small radially inwardly extending eccentric portion said eccentric portion being adapted to engage said pivot arm when said horizon bar is in neutral position in which engagement with said eccentric portion said pivot arm is adapted to be rotated about its axis in response to relative movement between said inner and outer gimbal frames, said pivot arm being confined to such engagement with said eccentric track portion within a predetermined range of relative movement between said gimbal frames, said pivot arm when moved out of engagement with said eccentric portion into said concentric portion of said track being free to move therein but restrained thereby against pivoting about its own axis.

BERT G. CARLSON.

REFERENCES CITED

The following references are of record in the file of this patent:

UNITED STATES PATENTS

| Number | Name | Date |
| --- | --- | --- |
| 2,207,414 | Rodanet | July 9, 1940 |